(12) United States Patent
Namuduri et al.

(10) Patent No.: US 7,941,256 B2
(45) Date of Patent: May 10, 2011

(54) METHOD FOR VEHICLE SUSPENSION WEAR PREDICTION AND INDICATION

(75) Inventors: Chandra S. Namuduri, Troy, MI (US); William C. Albertson, Clinton Township, MI (US); Mike M. Mc Donald, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 434 days.

(21) Appl. No.: 11/871,210

(22) Filed: Oct. 12, 2007

(65) Prior Publication Data

US 2009/0099719 A1    Apr. 16, 2009

(51) Int. Cl.
*G01M 17/00* (2006.01)
(52) U.S. Cl. ............ 701/29; 701/37; 73/760; 340/522
(58) Field of Classification Search .......... 701/1, 29, 701/30, 35, 36, 37, 39, 48, 70, 71, 82, 83, 701/91; 280/5.5, 5.501, 5.507, 5.515, 5.518; 73/11.04, 11.07; 702/33, 34
See application file for complete search history.

(56) References Cited

U.S. PATENT DOCUMENTS

| | | | | |
|---|---|---|---|---|
| 4,376,387 | A * | 3/1983 | Stevens et al. | 73/11.07 |
| 4,805,923 | A * | 2/1989 | Soltis | 280/5.501 |
| 4,853,860 | A * | 8/1989 | Achenbach | 701/37 |
| 5,531,122 | A * | 7/1996 | Chatham et al. | 73/760 |
| 6,184,784 | B1 * | 2/2001 | Shibuya | 340/438 |
| 2007/0005202 | A1 * | 1/2007 | Breed | 701/29 |
| 2007/0229248 | A1 * | 10/2007 | Mott et al. | 340/522 |
| 2008/0039994 | A1 * | 2/2008 | Mannerfelt | 701/30 |

* cited by examiner

*Primary Examiner* — Mark Hellner
*Assistant Examiner* — Helal A Algahaim

(57) ABSTRACT

A vehicle suspension wear prediction and indication method includes processing data inputs from a suspension system and converting the data inputs into a cumulative wear estimate. The data inputs are selected to model a magnitude factor and a duration factor related to the operation of the suspension system.

18 Claims, 4 Drawing Sheets

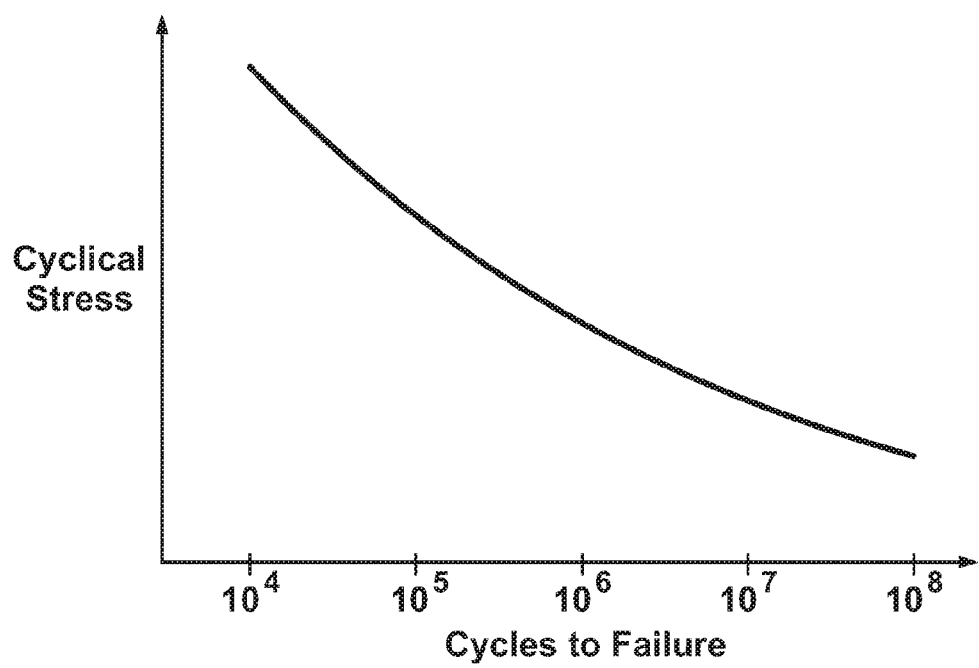
FIG. 5  Typical S-N Curve for a Metallic Piece
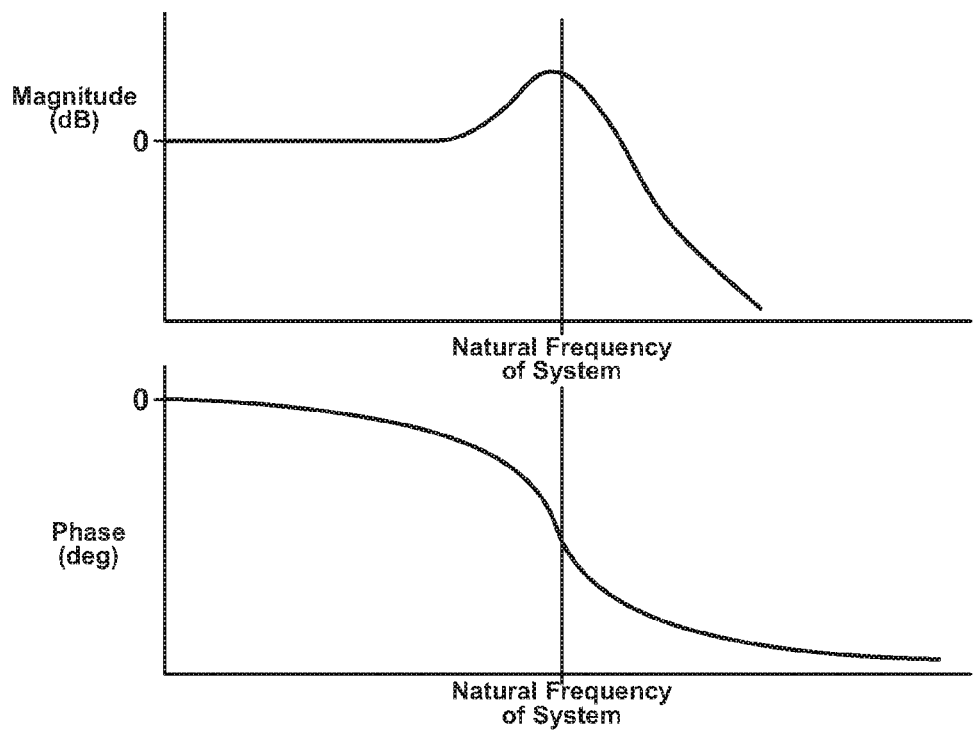
FIG. 6  Typical Bode Plot for a Second Order System

METHOD FOR VEHICLE SUSPENSION WEAR PREDICTION AND INDICATION

TECHNICAL FIELD

This disclosure is related to suspension systems in motor vehicles.

BACKGROUND

It is known that suspension components exhibit different handling and braking characteristics over their service life due to normal wear. Maintenance and repair costs due to worn components may be greater if the component is allowed to fail. It is therefore beneficial to predict and indicate when a component of a suspension system is nearing the end of its service life and replacement is recommended.

SUMMARY

A vehicle suspension wear prediction and indication method includes processing data inputs from a suspension system and converting the data inputs into a cumulative wear estimate. The data inputs are selected to model a magnitude factor and a duration factor related to the operation of the suspension system.

BRIEF DESCRIPTION OF THE DRAWINGS

One or more embodiments will now be described, by way of example, with reference to the accompanying drawings, in which:

FIG. 5 is a graphical representation depicting an exemplary S-N curve in accordance with the present disclosure; and FIG. 6 is a graphical representation depicting an exemplary Bode plot in accordance with the present disclosure.

DETAILED DESCRIPTION

Figure 1:
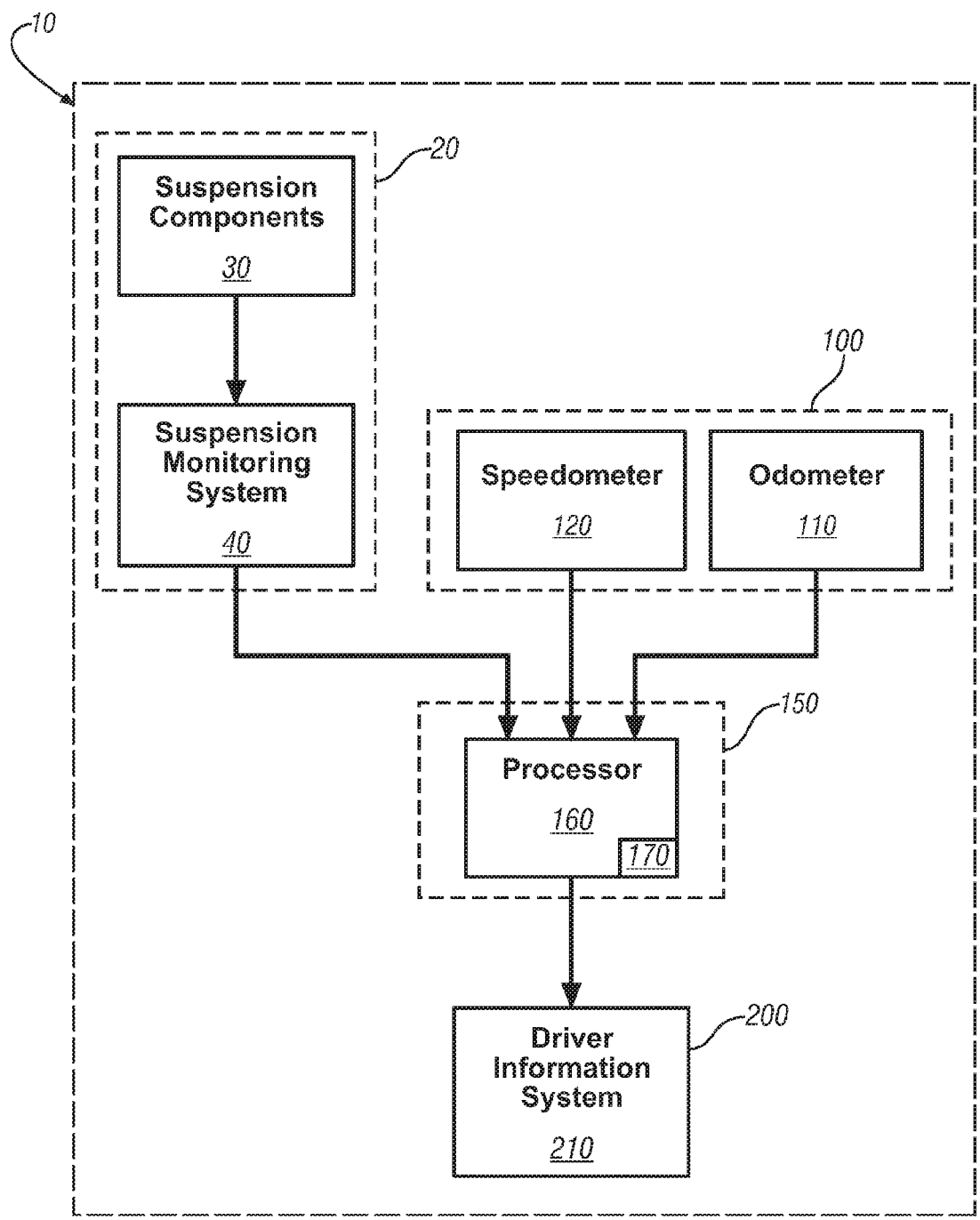
FIG. 1 is a schematic diagram exemplifying a first embodiment of a method in accordance with the present disclosure.

Referring now to the drawings, wherein the showings are for the purpose of illustrating certain exemplary embodiments only and not for the purpose of limiting the same, FIG. 1 illustrates a vehicle suspension wear prediction and indication method in accordance with an embodiment of the disclosure. All steps of this particular embodiment take place on-board the vehicle 10. Suspension system 20 includes at least one suspension component 30 and suspension monitoring system 40. Suspension monitoring system 40 may be coupled to suspension component 30 by way of sensors to monitor vehicle conditions and actuators to make operational adjustments as necessary. Suspension monitoring system 40 transmits data to wear information subsystem 150 pertaining to road conditions based upon road inputs acting upon the suspension component 30. This data includes a rough road metric. A vehicle information subsystem 100, including a speedometer 120 and an odometer 110, monitors the operation of the vehicle and transmits data to the wear estimation subsystem 150 pertaining to vehicle speed and the distance that the vehicle has traveled.

The wear information subsystem 150 includes a processor 160 and memory 170. The wear information subsystem samples the abovementioned information sent from suspension system 20 and vehicle information subsystem 100 at discreet intervals and stores these sample data input sets in memory 170. The intervals may be a simple time based sample, or the intervals may be based on other variables, including an incremental distance measurement, a span of time over which the vehicle operates at or above some threshold, or some other measure of elapsed operation and is not meant to be limited to the examples listed herein. While modern electronics allow very high sample rates, such a nearly continuous stream of data not only requires a great deal of memory to store, but has also been found to not necessarily predict the wear upon suspension system 20 more accurately than moderately timed samples. In this particular embodiment, wear estimation subsystem 150 takes a sample for every increment of distance traveled. Testing has shown that taking several measurements per kilometer is sufficient to accurately model the wear upon suspension system 20. In particular, a measurement every 100 meters has been validated to adequately balance sample rate and wear prediction accuracy.

The embodiment illustrated in FIG. 1 utilizes the rough road measurement, vehicle speed, and distance traveled data to synthesize a measure of how much wear suspension system 20 has experienced. Wear is caused by long or repeated exposure to a stress causing influence. Fatigue is a term of art related to wear that describes the resilience of a particular piece to repeatedly being exposed to a stress. A particular component, particularly a metal piece such as the structural members of suspension system 20, may be able to withstand a singular application of force without any measurable effect, but when a force at or above a particular threshold is applied through a great number of cycles, the piece will wear and may eventually fail. Such behaviors are described in the art in S-N curves which plot stress applied to a piece against the cycles to failure. An S-N curve is illustrated for purposes of example in FIG. 5. S, standing for stress, is a measure of force per unit of cross section of area of the piece being acted upon. As the magnitude of the forces acting upon a part goes up, the magnitude of the stresses goes up proportionally. N stands for the number of cycles that the stress is applied to the parts. An S-N curve illustrates a relationship between the magnitude of oscillating forces applied within a part and the duration with which the oscillating forces act upon the part to the wear experienced by the part. In this way, fatigue may be estimated by modeling a magnitude factor and a durational factor of forces acting upon a part.

Figure 4:
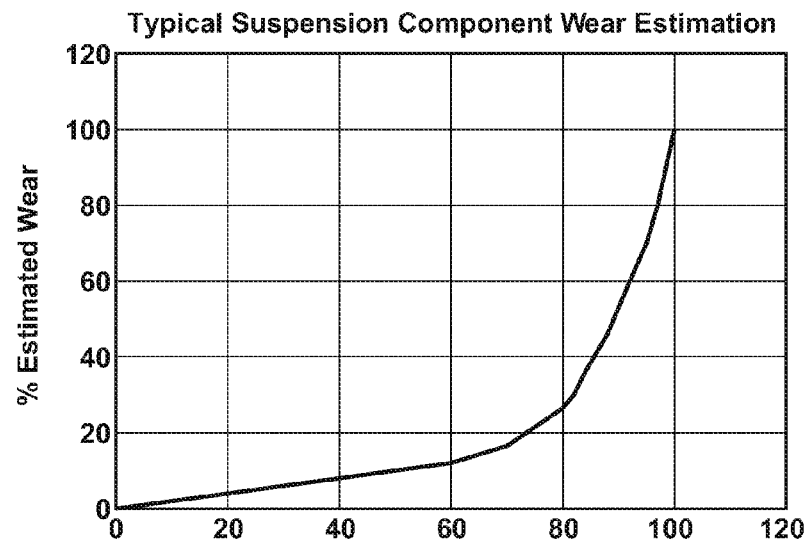
FIG. 4 is a graphical representation depicting exemplary wear behavior of a suspension component measured against the normalized accumulated rough road function as utilized in accordance with the present disclosure.

Suspension system 20 is subjected to cyclical or oscillating force inputs from the road through the life span of vehicle 10 and is, therefore, subject to fatigue. Structural members or simple suspension components are subject to cyclical forces of varying magnitude in the form of bumps on the road. These cyclical forces create predictable wear behavior in the structural members in the form of fatigue. In addition to the structural members, suspension systems are also made up of more complex components, such as shock absorbers, dampers, and springs. Each of these complex components may degrade over time and cyclical usage. A shock absorber, for example, may slowly leak damping fluid and eventually lose performance or damping force as a result of the degradation. The complex components of the suspension system can be shown statistically to wear over a great number of cycles in a similar fashion to simple structural members. FIG. 4 illustrates the wear life of an exemplary suspension component.

The magnitudes of forces applied to suspension system 20 are not constant, but instead vary with vehicle usage. A single S-N curve could not be used to model such a system due to the variable nature of the inputs. Instead, an algorithm may be used to model the wear upon suspension system 20 based on a cumulative model. Wear is preferably modeled in a weighted accumulative estimate, taking into account that higher forces create more wear per cycle than lower forces. In order to predict the level of wear on suspension system 20 and its components, and thereby predict and indicate an end to their lifecycles, it is preferable to model the fatigue experienced by the components by summing the impact indicated by individual data input values. In this way, variable stress inputs and a measure of duration may be utilized to estimate wear upon suspension system 20.

As aforementioned, the determination of a magnitude factor is important to estimating wear with a part or system. The rough road measurement is a measure of road conditions and the road inputs exerted upon suspension system 20, supplying one element in determining the force of the road inputs upon suspension system 20. However, the relationship of road conditions to forces upon suspension system 20 is complex. And, depending upon the source of the rough road measurement, whether it be accelerometer inputs from suspension system 20, variable wheel rotation measurements from an anti-lock braking system, or road surface roughness estimations from a global positioning system and digital map data (GPS) subsystem, the rough road measurement may be more indicative of the actual forces applied to suspension system 20, or the measurement may be more indicative of a general state of the road and less indicative of the actual forces applied. In order to accurately model the forces involved, the rough road measurement may be paired with vehicle speed in order to robustly and accurately determine the magnitude of forces acting upon suspension system 20.

The rough road measurement is paired to a measurement of vehicle speed to estimate the magnitude factor of road conditions acting upon suspension system 20. Suspension system 20 exhibits many of the behaviors of an idealized mass-spring-damper system. A behavior of mass-spring-damper systems that is relevant to this discussion is the tendency of such a system to follow a second order system frequency response. Frequency response for a second order system is frequently in a graphical representation known as a Bode plot, and an example of the frequency response of a typical second order system is shown in FIG. 6. The top portion of the plot shows the magnitude of the response versus the frequency of the input. The bottom portion of the plot shows the phase of response versus the frequency of the input. The Bode plot describes behaviors well known to those familiar with the study of vibrations and suspensions, and will not be explored in detail herein. As is pertinent to this discussion, the Bode plot illustrates a relationship for a given component between the frequency of an input force and the magnitude of the resulting output force. Bumps for a given surface, for instance a gravel road, will input a force of a characteristic frequency depending on the vehicle speed. Understanding the surface of the road and understanding the movement of vehicle 10 over the surface generates an understanding of the frequency of the input experienced by the vehicle. In addition, different components of suspension system 20 exhibit different natural frequencies, so an understanding of the forces acting on and internal to suspension system 20 enables accurate prediction of suspension wear. Because both the rough road measurement and vehicle speed are indicative of the forces acting upon suspension system 20, both the rough road measurement and the vehicle speed are used to calculate the magnitude factor.

In the embodiment illustrated in FIG. 1, the magnitude factor is modeled as a function of the rough road measurement, derived from sensors monitoring suspension components 30 within suspension system 20 via suspension monitoring system 40, and the vehicle speed from speedometer 120, and the duration factor is modeled as a function of distance traveled from odometer 110. However, it will be appreciated that other data inputs or variables may be used to approximate the magnitude factor and duration factor.

As aforementioned, memory 170 stores a database of data inputs from suspension system 20 and vehicle information subsystem 100. In the embodiment illustrated in FIG. 1, memory 170 is shown as an integral unit with processor 160, and need not be distinguishable from the processing function, depending upon the technology employed in wear estimation subsystem 150. Processor 160 contains algorithms that transform the database of data inputs into a cumulative wear estimate. The cumulative wear estimate provides a measure of how much wear has been experienced by the suspension system as a whole. This wear estimate may then be compared with look up values stored in memory 170 or that are otherwise available to approximate the life spans of particular components. Components contemplated to be modeled include structural members, shock absorbers, dampers, struts, springs, bushings, torsion bars, engine mounts, jounce/rebound bumpers, but are not intended to be limited thereto. As the life span of a component reaches a certain stage, output device 200 is instructed to provide an indication of wear based upon the wear estimate, e.g. by displaying a warning to the vehicle operator. In this embodiment, output device 200 is a driver information subsystem 210 which may take the form of a message board, LCD display, LED alpha-numeric message indicator, or other graphic interface device. Driver information subsystem can additionally include an audible message or tone.

The processing performed to generate the cumulative wear estimate may take many embodiments. One embodiment contemplated accesses the database of data inputs stored in memory 170 and converts them into an accumulated normalized rough road function (ANRRF). A formula derived for ANRRF is as follows:

$$ANRRF = \frac{100 \times \left\{ \sum \left[ RRE \times D \times \left( \frac{VS}{VS_n} \right)^k \right] \right\}}{D_n} \quad (1)$$

wherein RRE is a rough road estimate during a travel interval, D is the distance traveled in the interval, VS is a vehicle speed during the interval, $VS_n$ is a nominal vehicle speed constant, $D_n$ is a nominal distance over the life of the vehicle, and k is a calibration constant. The constant values of the function will vary from vehicle model to vehicle model. The ANRRF is a measure of the cumulative operation that suspension system 20 has experienced over time. The ANRRF may then be utilized to predict cumulative wear on a suspension system-wide basis or on a component by component basis. For example, on a given suspension system, the front shock absorbers may desirably be replaced at one ANRRF value, and the torsion bar may desirably be replaced at another greater ANRRF value. These values may be keyed for alarm to output device 200 by a simple look up table. Another way to accomplish tracking the various components is to assign each component an individual cumulative wear estimate algorithm based upon a system-wide ANRRF value to model each particular life span. Upon replacement of a component, the indicated life span of the particular component may be reset to monitor the wear on the newly installed replacement. In an alternative embodiment, separate ANRRF algorithms may be utilized for different components to better approximate the particular response of each component. For example, a particular component may prove more wear resistant to high force impacts but be less wear resistant to high mileage usage, whereas another component may be more wear resistant to high mileage usage, but might be less resistant to large magnitude forces. Separate but similar components could share an ANRRF algorithm but maintain separate cumulative wear estimates. For example, if one shock absorber is individually replaced mid-way through its normal life, it could continue to share the same ANRRF algorithm with the remaining shock absorbers, but the individual cumulative wear estimate for the replaced shock absorber would indicate that it had more remaining life span than the other shock absorbers.

Figure 2:
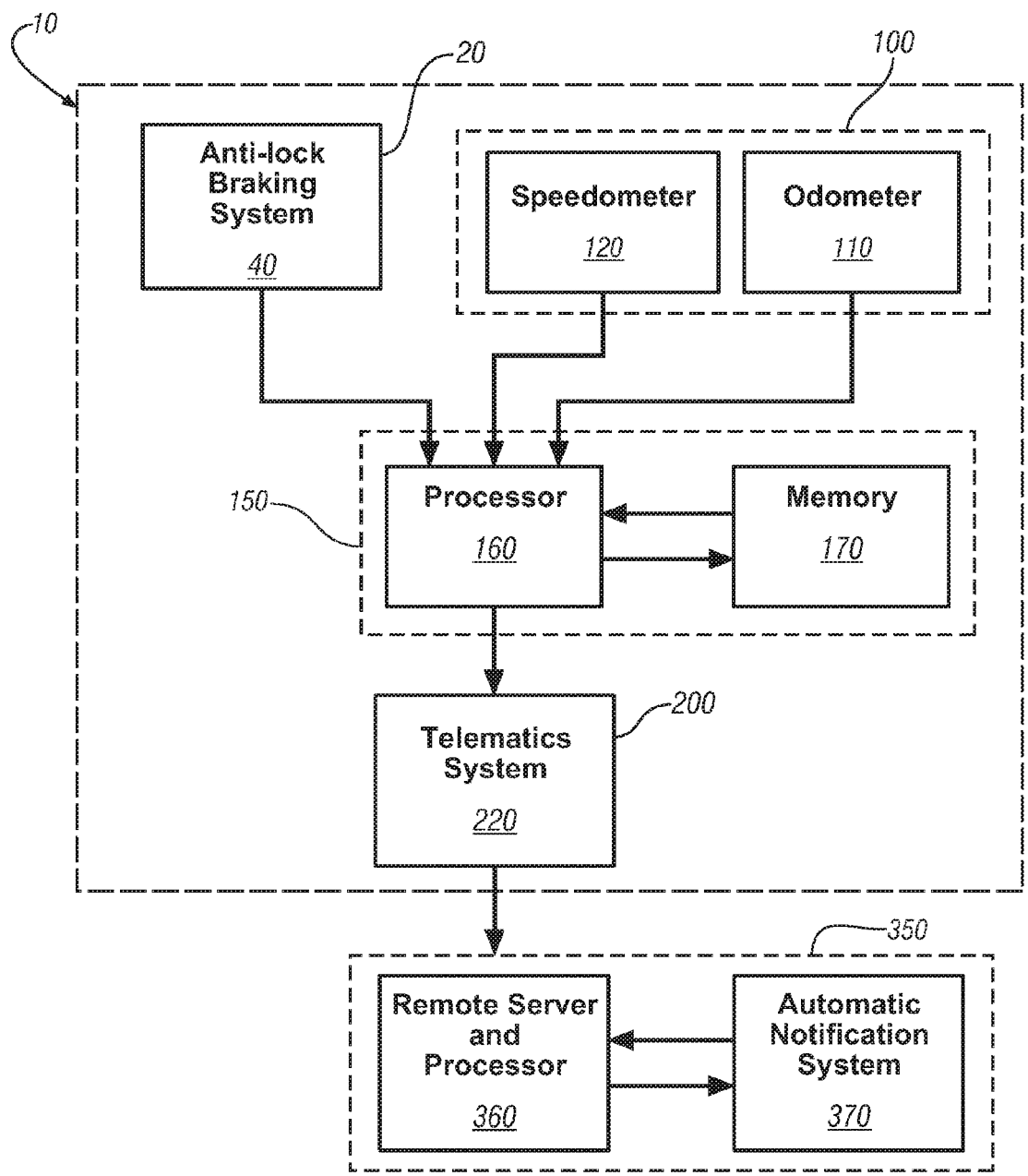
FIG. 2 is a schematic diagram exemplifying a second embodiment of a method in accordance with the present disclosure.

FIG. 2 illustrates a vehicle suspension wear prediction and indication method in accordance with another embodiment of the disclosure. In this embodiment, vehicle 10 corresponds with remote system 350. Output device 200 includes a telematics system 220 capable of interacting with remote system 350 by a wireless communications network, an infrared or RF base station, or other similar communication method. In this embodiment, remote system 350 includes a remote server and processor 360 operated at a remote location and an automatic notification system 370; however, it should be appreciated that remote system 350 could take many forms, including an owner's personal computer, personal digital assistant, cell phone, or other electronic device. Remote server and processor 360 processes information received from telematics system 220 and generates appropriate requests to automatic notification system 370. Information received by remote system 350 may be in the form of raw data inputs from the database within memory 170, an ANRRF value from wear estimation subsystem 150, or alarms indicating required maintenance resulting from a cumulative wear estimate.

As aforementioned, different variables may be used to approximate magnitude and duration factors. In the particular embodiment illustrated by FIG. 2, data inputs relating to the rough road measurement are received from suspension system 20 through anti-lock braking system 50. The rough road measurement in the embodiment illustrated in FIG. 1 was derived directly from sensors located on suspension components 30. In the embodiment of FIG. 2, the rough road measurement is not directly derived from impacts upon the suspension. Instead, the measurement is inferred from variable wheel speeds caused by the wheels of vehicle 10 moving up and down relative to each other on a rough road. As one wheel is pushed up, its rate of spin relative to the still engaged wheels changes slightly, and this discrepancy can be used to synthesize a rough road measurement.

Figure 3:
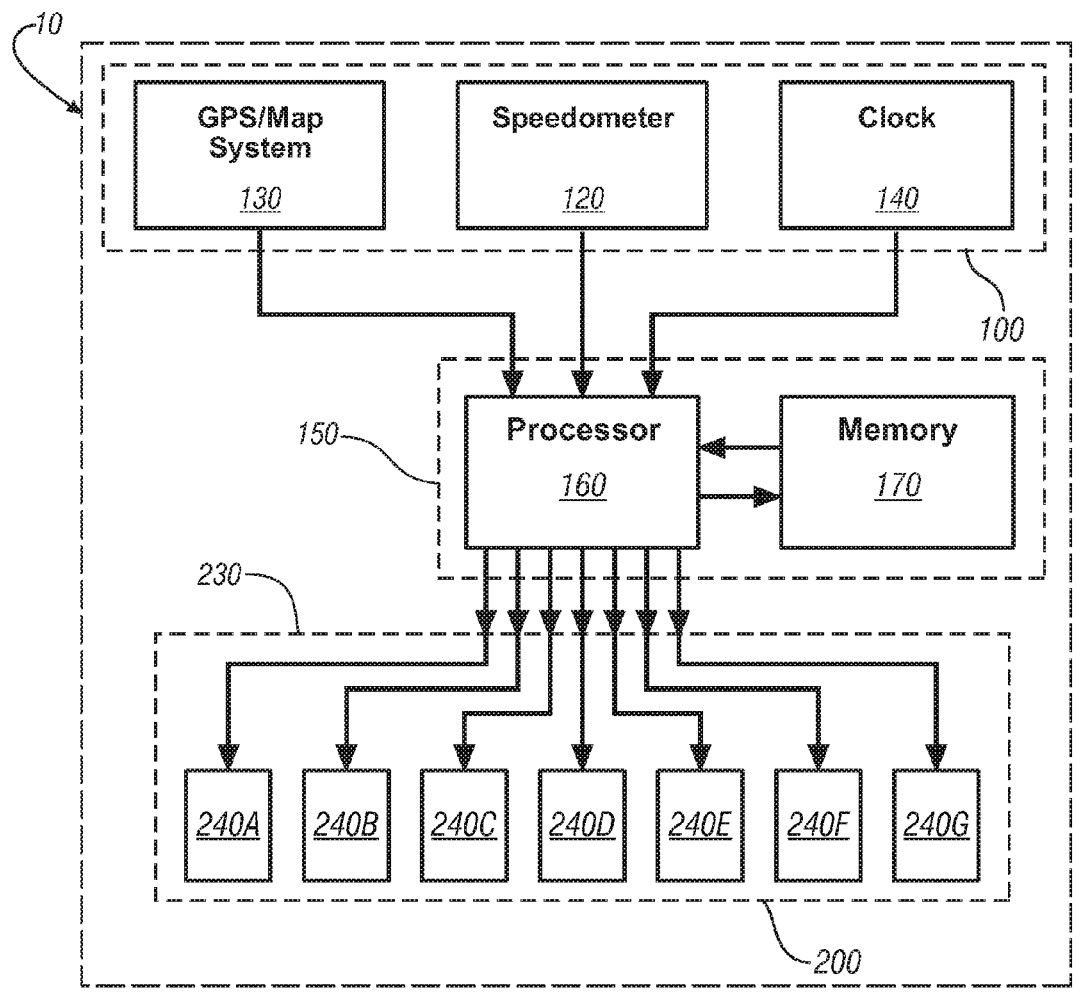
FIG. 3 is a schematic diagram exemplifying a third embodiment of a method in accordance with the present disclosure.

FIG. 3 illustrates a vehicle suspension wear prediction and indication method in accordance with yet another embodiment of the disclosure. As aforementioned, different variables may be used to approximate magnitude and duration factors. In this particular embodiment, the rough road measurement is derived from a GPS subsystem 130. As is well known in the art, GPS devices are commonly available which allow a vehicle's location to be pinpointed on a map. Such a system may be utilized to classify roads based on road type and surface and generate a rough road measurement based upon corresponding projected road conditions. Over time, actual anomalies in road conditions that vary from the projected road conditions average out.

In addition, this embodiment illustrates that distance need not be utilized in the duration factor. In the embodiment illustrated in FIG. 3, a clock 140 has been substituted for odometer 110. Algorithms within processor 160 may utilize a time of vehicle operation to compile the duration factor as a measure of cycles relevant to the cumulative wear estimate calculation. The data input from clock 140 may also be used to set the sample rate at particular time increments as an alternative to the distance traveled increments previously described. Processor 160, receiving the data input related to time from clock 140, may continuously store data when the ignition to vehicle 10 is turned on, or processor 160 may correlate the time data to vehicle speed data or some other input such as engine speed and only store in memory 170 the time data values that have corresponding values above a certain threshold. This filtering of data inputs does not compromise the cumulative wear estimate accuracy because the magnitudes of forces acting upon suspension system 20 tend to be small at low speeds. By filtering out data inputs at low vehicle speeds, processor 160 can select only data input values for storage in memory 170 that are relevant to the cumulative wear estimate.

The embodiment illustrated in FIG. 3 also shows an alternative embodiment that output device 200 might take as an indicator light subsystem 230. Such a system utilizes warning lights 240A through 240G to indicate to the operator that a particular component of suspension system 20 has reached the end of its lifecycle and is in need of replacement. In the alternative, a similar output device 200 could store unseen similar component specific indications, utilize indicator light subsystem 230 equipped with a single "check suspension" light, and retain the indications for query by trained maintenance professionals through engine diagnostic tools well known in the art.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A vehicle suspension wear prediction and indication method, comprising:
    processing data input sets associated with usage of a suspension system, said data input sets selected to model a magnitude factor and a duration factor, wherein said magnitude factor comprises a rough road measurement and a vehicle speed measurement, and wherein said rough road measurement originates from one of a variable wheel rotation measurement determined using an anti-lock braking subsystem and an accelerometer input determined using a suspension monitoring subsystem, said processing including conversion of said data input sets into a cumulative wear estimate; and
    providing an indication of wear based upon the cumulative wear estimate.

2. The method of claim 1, wherein said duration factor comprises distance traveled.

3. The method of claim 1, wherein said duration factor comprises time of operation.

4. The method of claim 1, wherein said processing comprises:
  processing said data input sets to generate an accumulated normalized rough road function operative to track wear upon said suspension system; and
  calculating said cumulative wear estimate based on said accumulated normalized rough road function.

5. The method of claim 4, further comprising calculating a plurality of component specific cumulative wear estimates based on said accumulated normalized rough road function.

6. The method of claim 1, wherein said data input sets are received at predetermined intervals.

7. The method of claim 6, wherein said intervals comprise a distance traveled.

8. The method of claim 7, wherein a preferred distance traveled is between about 50 meters and 250 meters.

9. The method of claim 7, wherein a preferred distance traveled is between about 80 meters and 120 meters.

10. The method of claim 7, wherein said intervals comprise an elapsed time of operation.

11. The method of claim 1, further comprising reporting said cumulative wear estimate to an output device.

12. The method of claim 11, wherein said output device is a telematics device, said telematics device configured to communicate said cumulative wear estimate to a remote system.

13. The method of claim 11, wherein said output device uses a combination of audible and visual messages to communicate said cumulative wear estimate.

14. A vehicle suspension wear prediction and indication method, comprising:
  receiving data input sets comprising a rough road measurement, a vehicle speed, and a durational measurement at discrete intervals, wherein said rough road measurement originates from a variable wheel rotation measurement determined using an anti-lock braking subsystem;
  processing said data input sets to generate an accumulated normalized rough road function, said accumulated normalized rough road function operative to track wear upon said suspension system; and
  utilizing said accumulated normalized rough road function to predict maintenance requirements of a suspension system, said maintenance requirements associated with projected suspension system component life spans.

15. The method of claim 14, said prediction utilizing models of cumulative suspension wear.

16. The method of claim 14, further comprising reporting said maintenance requirements to an output device.

17. The method of claim 4, wherein processing said data input sets to generate an accumulated normalized rough road function operative to track wear upon said suspension system comprises processing the data input sets according to the following equation:

$$ANRRF = \frac{100 \times \left\{ \sum \left[ RRE \times D \times \left( \frac{VS}{VS_n} \right)^k \right] \right\}}{D_n}$$

wherein
ANRRF is a magnitude of the accumulated normalized rough road function,
RRE is a rough road estimate during a travel interval,
D is distance traveled in the travel interval,
VS is a vehicle speed during the travel interval,
$VS_n$ is a nominal vehicle speed constant,
$D_n$ is a nominal distance over the life of the vehicle, and
k is a calibration constant.

18. The method of claim 14, wherein processing said data input sets to generate an accumulated normalized rough road function operative to track wear upon said suspension system comprises processing the data input sets according to the following equation:

$$ANRRF = \frac{100 \times \left\{ \sum \left[ RRE \times D \times \left( \frac{VS}{VS_n} \right)^k \right] \right\}}{D_n}$$

wherein
ANRRF is a magnitude of the accumulated normalized rough road function,
RRE is a rough road estimate during the discrete interval corresponding to the data input set comprising the rough road measurement,
D is distance traveled during the discrete interval corresponding to the data input set comprising the durational measurement,
VS is a vehicle speed during the discrete interval corresponding to the data input set comprising the vehicle speed,
$VS_n$ is a nominal vehicle speed constant,
$D_n$ is a nominal distance over the life of the vehicle, and
k is a calibration constant.

* * * * *